Oct. 3, 1933. R. VON REPPERT 1,928,656
COMBINED TYPEWRITING AND COMPUTING MACHINE
Filed Oct. 25, 1926 6 Sheets-Sheet 2

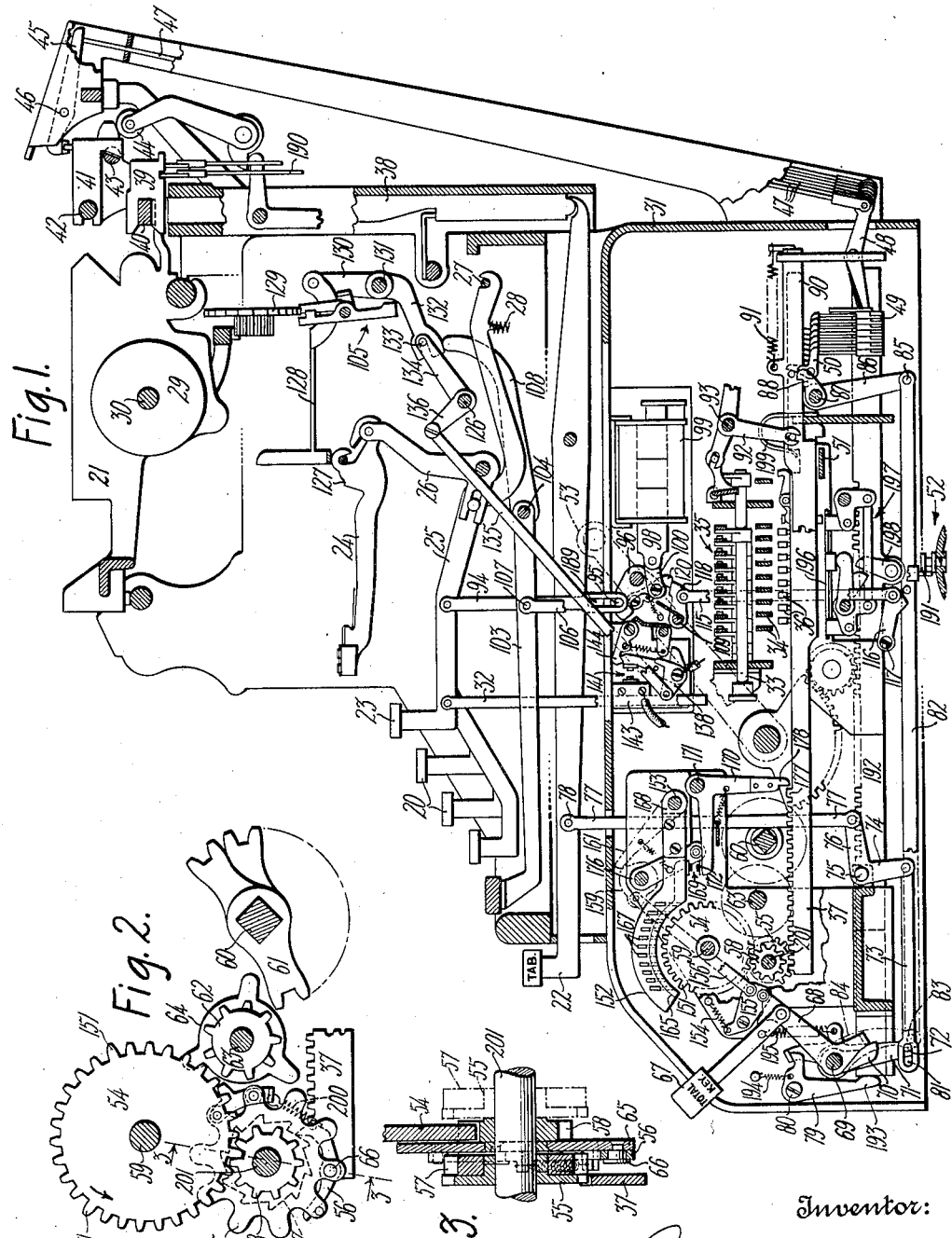

INVENTOR:
Richard von Reppert
BY
ATTORNEY.

Oct. 3, 1933.  R. VON REPPERT  1,928,656
COMBINED TYPEWRITING AND COMPUTING MACHINE
Filed Oct. 25, 1926  6 Sheets-Sheet 3
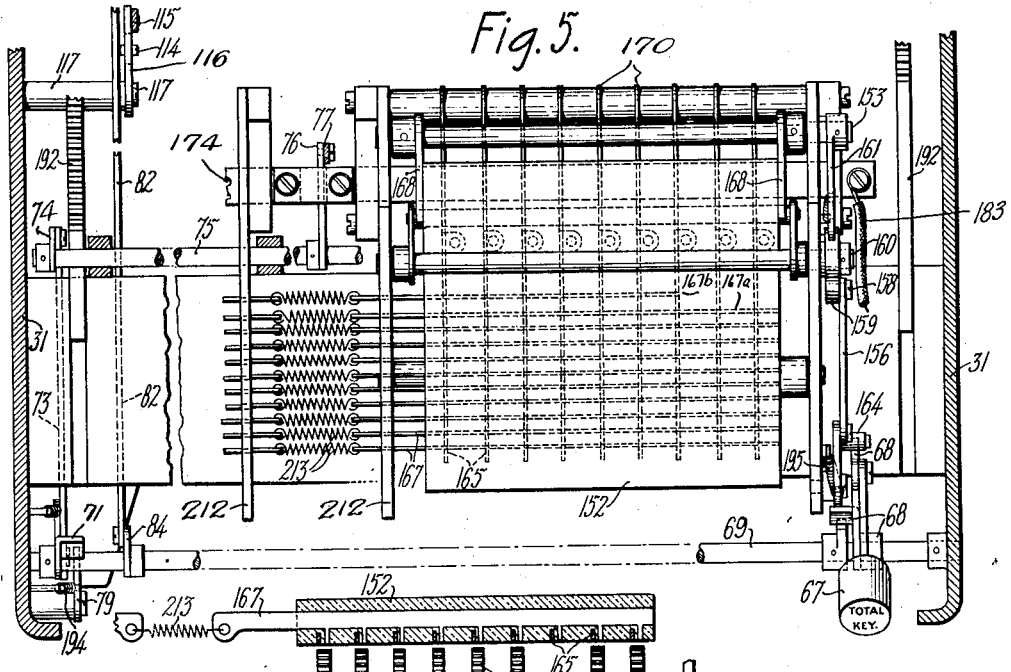
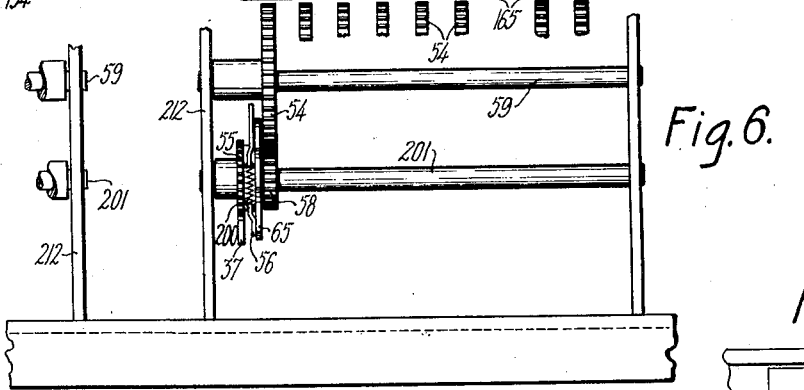
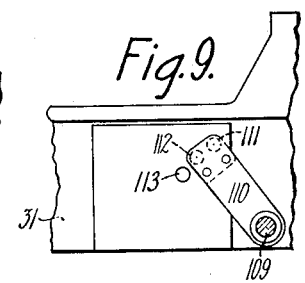
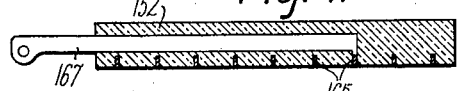
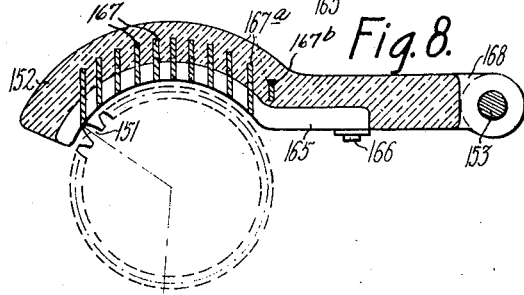
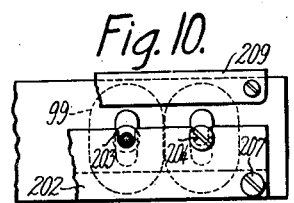

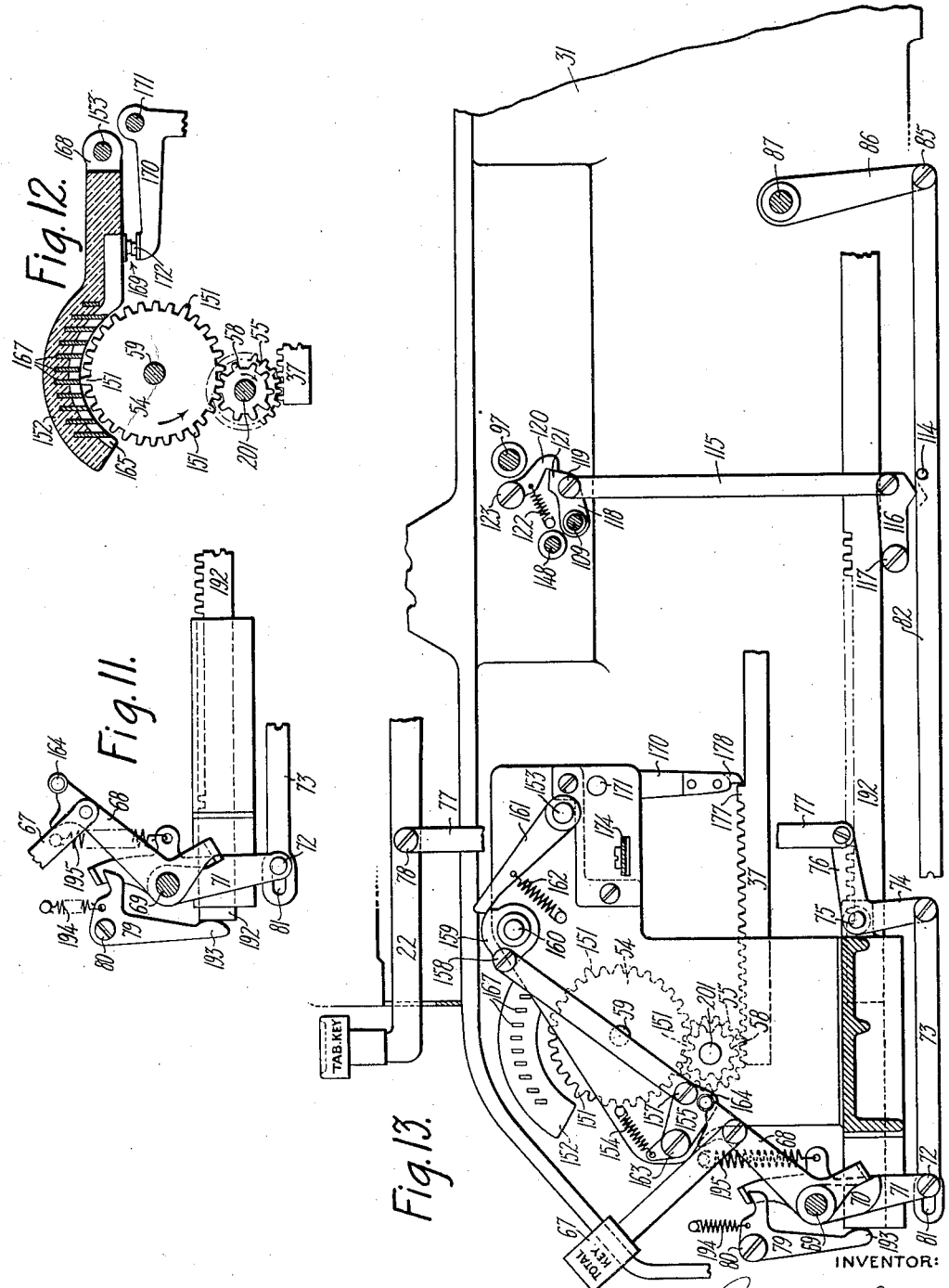

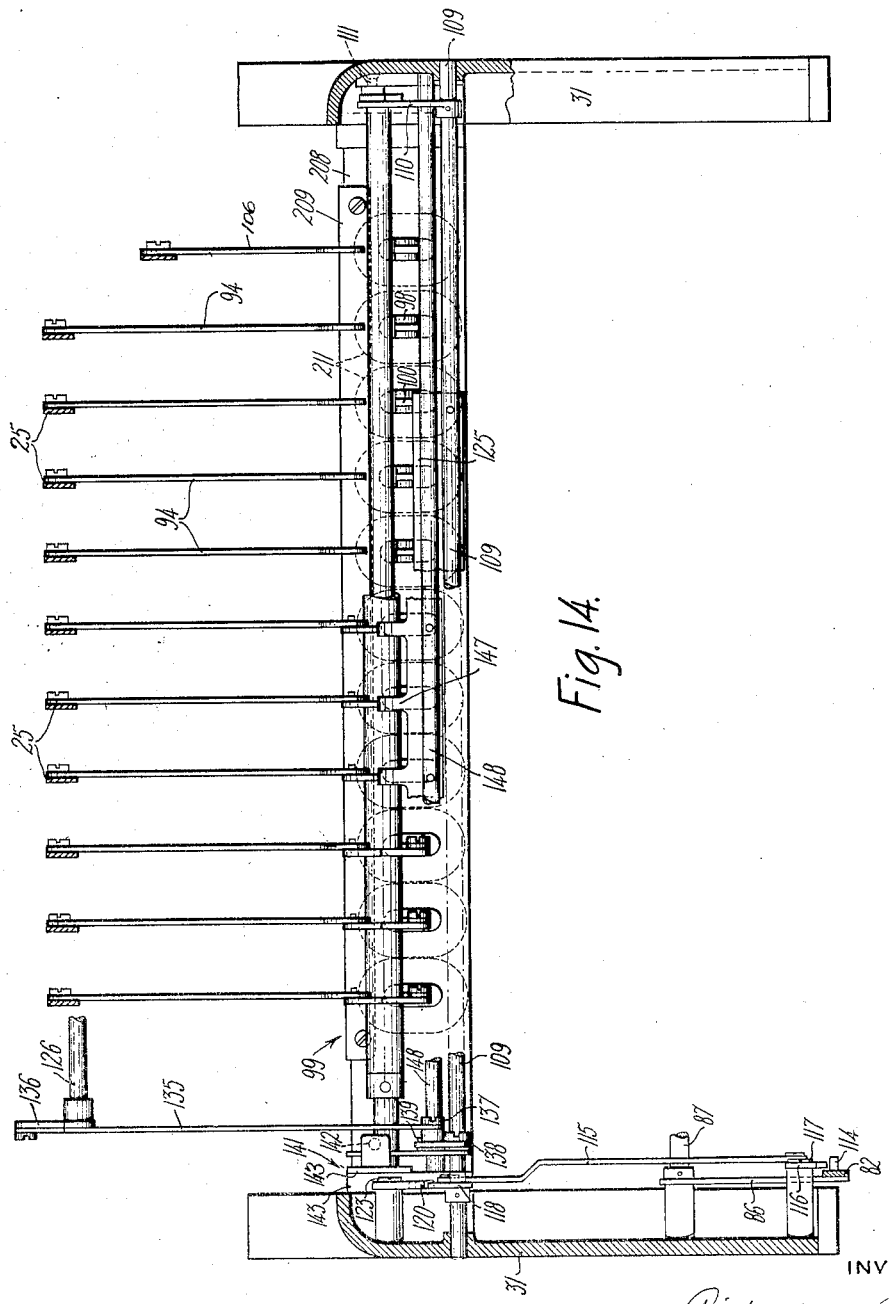

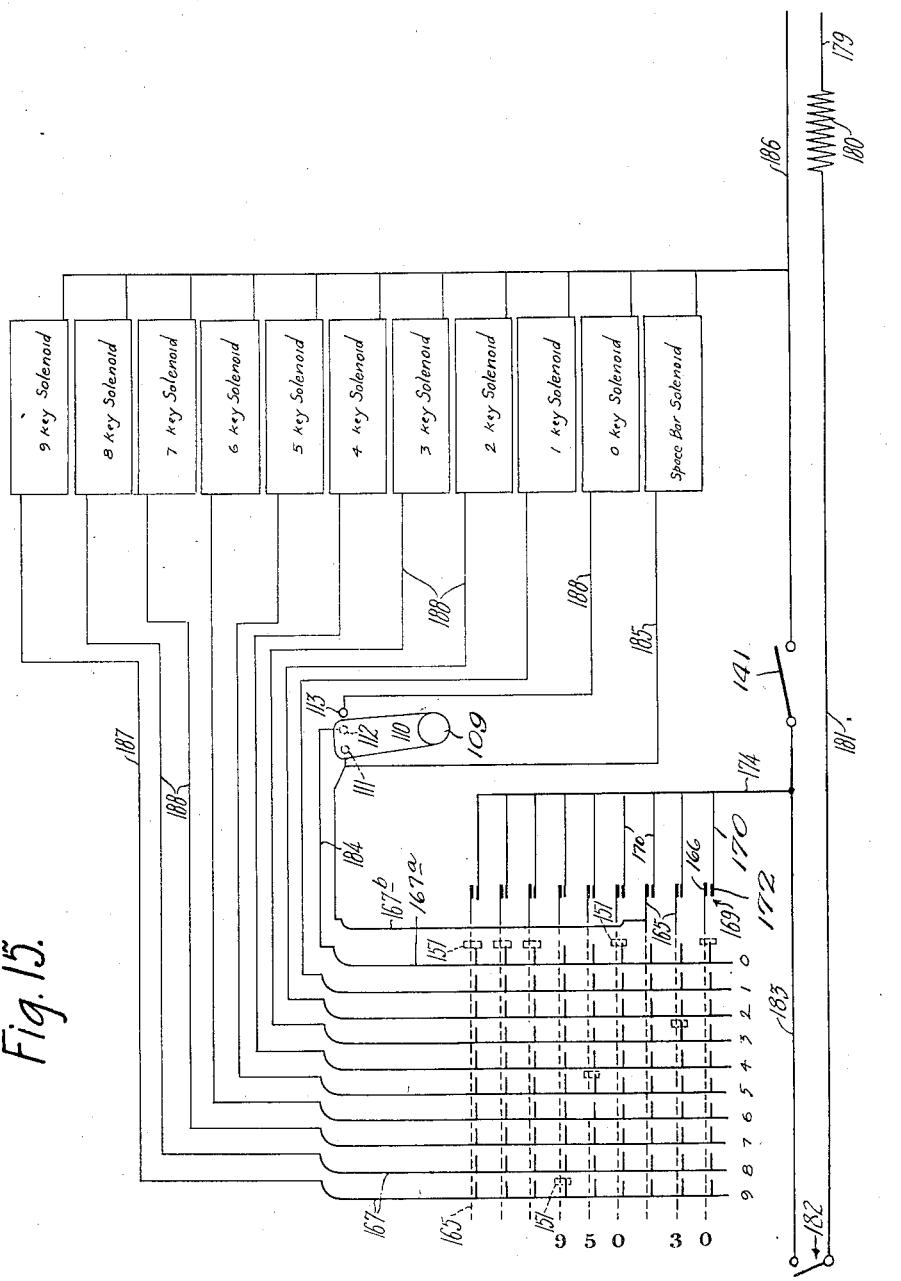

Patented Oct. 3, 1933

1,928,656

UNITED STATES PATENT OFFICE 1,928,656

COMBINED TYPEWRITING AND COMPUTING MACHINE

Richard von Reppert, Hartford, Conn., assignor, by mesne assignments, to Elliott-Fisher Company, New York, N. Y., a corporation of Delaware Application October 25, 1926. Serial No. 143,863

62 Claims. (Cl. 235—60)

This invention relates to means for typewriting the totals in combined typewriting and computing machines of the well-known Underwood-Hanson type, and others.

Each time that a numeral typewriter-key is depressed, a condition is set up in the computing mechanism, which is subsequently utilized to accumulate the amount typed, in a totalizer or register, by means of a general operator.

The usual practice has been for the operator to copy the total shown by the totalizer. This procedure is slow and leads to errors, which are difficult to detect.

According to certain features of this invention there is provided mechanism for the purpose of automatically typing the amounts which have been accumulated in the totalizer. This mechanism may include a total-key for each totalizer, which is effective to position the carriage by operating a tabulating key, and then to type automatically the amount accumulated in the totalizer.

To accomplish this result, an electromagnet or solenoid is provided for each of the numeral keys 1 to 0 of the typewriter and one solenoid for the typewriter space-bar. A contact device is also provided for each totalizer which is automatically rendered operative upon actuation of its respective total-key. Each contact device co-operates with devices connected to the total-wheels of its respective totalizer to select for operation the electromagnets corresponding to the digit-positions of the total-wheels, and the typewriter-carriage establishes circuits in denominational order in succession from highest to lowest, so that, when the carriage is in the highest denominational position of the respective column, a circuit is closed, to actuate either the space-bar magnet as will be explained or the electromagnet corresponding to the digit-position of the total-wheel of the highest denominational order, and then the carriage moves automatically to the next lower denominational position, to close a circuit there, and so on.

After each amount is indexed in pin-bars by the numeral-keys, the general operator is operated, and the amount is run into a type-controlling register, so that at all times said register is in position for controlling the printing of the total of the amounts that have been accumulated. When the paper-carriage of the typewriter is passing through the total-adding zone, said carriage is caused to close seriatim a succession of denominational electric circuits, for the purpose of rendering effective the type-controlling wheels of corresponding denominations. The selection of the type is dependent upon the position of the wheel. Each type has an independent operating solenoid, said solenoid being controllable in any denominational position of the carriage. Each solenoid-circuit is controllable at two points. At one point it is controlled by the carriage, and at the other point it is controlled by the wheel.

In writing the total, it is provided that when a numeral-type is caused to print, the carriage-escapement universal bar shall be operated in the regular way. This operation of the universal bar causes a novel train of mechanism to connect a pair of contacts to short-circuit the type-operating solenoid-circuit, and permit the operated solenoid to return to its normal position, thus permitting the operated key-lever and type-bar to also return to their normal positions. Means is provided whereby the return of the operated numeral-key-lever will re-open said short-circuiting contact-members. As soon as a type-bar returns to normal position, the universal bar is permitted to return, and thereby cause the carriage to step to the next denominational position, and to close the electrical circuit for the next solenoid to operate the next selected type-bar.

The selective closing of the circuits to the electromagnets that operate the numeral-types 0 to 9 at each denominational position of the carriage in a computing zone, may be accomplished by means of a denominational set of toothed wheels arranged side by side and rotated by means of the pin-bars to accumulate digital values. Each toothed wheel has a circuit-closer, which may rotate to any position from 0 to 9. The circuit-closer may be a long tooth in each wheel operable to bridge over contact-bars that are exposed flush in the face of a distributing block.

Said contact bars include digit-bars extending along the row of toothed wheels and arcuately spaced according to the digit positions of the long bridging teeth, and each digit-bar in combination with a transverse, arcuate denominational bar, of which there is one included in said distributing block for each toothed wheel, may form in conjunction with the bridging tooth a circuit to a numeral-typing solenoid.

There is one magnet for each type "0" to "9" and also a magnet for the space-bar. The long bridging teeth represent, when the register is clear, the zero position of each wheel. When the wheels are rotated for different items by means of the usual Underwood pin-bars and carry-over devices, the long teeth are rotated repeatedly, each rotation being for the proper digital distance, and the final positions of the long teeth represent the total of the successive items typed. Each long tooth thus has a digital value dependent upon the position of the tooth, that is, upon the extent of its angular displacement from the zero position, and it bridges, upon operation of the total-key, an appropriate pair of the aforesaid contact bars to partially close a circuit which includes a typing magnet of the same value. These digit or magnet selecting circuits, closed by the long teeth, are in main open circuits that are closed by the letter-feeding movements of the carriage in the computing zone. This is done in such a manner that the tooth-selected main circuits are closed seriatim, beginning at the highest denomination, to energize the electromagnets to print the corresponding numerals, dependent upon the positions of the teeth.

When any wheel stands at zero, it is in position to control the printing of the zero-type. But it is not desired to print these zero-types at the beginning of the typing of a total having less denominational places than the capacity of the register. It is therefore provided that the zero-solenoid shall be cut out, so that no zero shall be printed in advance of the first significant digit. It is also provided that a special solenoid shall be cut in at the same time the zero-solenoid is cut out. This special solenoid may be the space-bar solenoid and operates the letter-feeding mechanism of the typewriter-carriage. As soon as the carriage thus advances to the proper point, the first digit is typed, and the letter-feeding solenoid is thereby automatically cut out, while the zero-printing solenoid is cut in.

The "total" key thus has numerous functions which may now be summarized. The first is to effect the operation of a tabulating mechanism, and the typewriter-carriage is thereby permitted to jump to the proper column-position, where it is arrested at the highest denominational position, regardless of the number of digits in the total. However, it is not desired to print on the work-sheet any zeros ahead of a number. Therefore, when required, the carriage is automatically letter-spaced (without printing) until it reaches a position for the typing of the first significant digit in the total. This automatic letter-spacing begins upon the arrest of the carriage at the highest denominational position just stated. The idle feeding of the carriage is accomplished by a solenoid-mechanism which is brought into use by means of said total-key, so that the carriage steps along until it reaches the position for the first digit in the total to be printed, whereupon said carriage-stepping solenoid ceases to function.

At each step of the carriage in the total-printing zone, it closes one of a series of denominational circuits. Each digit-type to be operated is driven by a solenoid that is controllable by the circuit-closing, that is, type-controlling wheel of the selected denomination.

Another of the numerous functions of said total-key therefore is to bring the type-printing solenoids into use. For this purpose said total-key moves a set of circuit-closing means to position to be controlled by the set of typing wheels. These wheels may take part in closing circuits through solenoids which are connected to numeral-printing type-bars. One solenoid-circuit may be closed and one type printed for each denominational position of the carriage in the total-zone.

The said set of circuit-closing means are preferably embodied in the aforesaid distributing block which is shifted into effective position by means of the total-key. The block has the form of a segment, concentric with the axis of the wheels. The inner face of the block has the set of circuit-closing digit-bars that extend parallel with the axis of the gears. Each digit-bar has a set of contact-teeth, one for each wheel. Upon each wheel is the long tooth which may selectively engage any bar-tooth. The wheel-tooth closes the circuit by bridging two contacts, that is, by connecting a bar-tooth to one of a set of curved strips that are arranged crosswise of said digit-bars, and flush with the contact-teeth that project from said digit bars. The long tooth upon any wheel may thus form a bridge between the bar-tooth and the curved strip, thereby closing the circuit of the solenoid for the selected digit-type, while the main or energizing circuit is closed by reason of the action of the carriage; the main circuits being closed and then re-opened, one after another, by the carriage, as it steps through the total-printing zone. The wheels are stationary during the total-typing operation.

For closing the main or denominational circuits in the total-printing zone, there is brought into use denomination-selecting trains which are operable by a dog upon the carraige, said trains including jacks engageable by said dog, and also including rods and levers whereby each jack may set forward a pin-carrying bar, which forms part of the mechanism whereby the numeral-keys may index the digits of a number. This bar, as it is set forward, causes the closing of a main circuit for that denomination, as above noted. This main circuit includes the circuit that is also closed through any type-bar-operating solenoid that is selected by the wheel of that denomination.

Since it is desired that the wheels shall all be returned to zero, the total-key also conditions the machine for performing subtraction. By the automatic operation of the type-trains to print the total a digit-pin is also set upon each pin-bar so that at the completion of the printing of a total, all of the pin-bars may have pins set thereon corresponding to said total. Then at the operation of the general operator, the pin-bars are advanced as a group, and effect the return of the aforesaid wheels to zero-positions. The general operator also restores the total-key to normal position, with corresponding returns of other parts.

When the amount to be typed has less than the full quota of denominations, it is necessary, as stated, to position the typewriter-carriage by progressively jumping all the zeros in front of the first significant figure of the amount to be typed. However, since the normal position of each register wheel is its zero position, a difficulty is presented, when, for the zero setting of the wheels, some of the wheels have to merely space the carriage, whereas some of the wheels should also be effective to print a zero on the work-sheet. This problem is solved by means of a switch, which is effective upon operation of the total-key, to close an electrical circuit through the electromagnet operating the space-bar. This switch is operated to divert the current from the space-bar electromagnet to the zero-key electromagnet upon actuation of any first significant figure 1 to 9. This mechanism is fully automatic.

The Underwood-Hanson computing machine is usually provided with subtracting mechanism which is well known in the art. In this invention this mechanism is used to clear the totalizer by pin setting the amounts during typing and by subsequently operating the general operator.

Another feature of this invention relates to means for automatically spacing the figures of the totals so as to easily distinguish the dollars from the cents. To this end, it is proposed to so close the circuit to the space-bar-solenoid so that it will automatically letter space the carriage between the dollars and the cents positions, thus leaving a blank space between them.

It will be understood that the totalizer or register need not be provided with readable dial-wheels, and that when it is desired to ascertain the amounts entered into the registers it is only necessary to depress the total-key in order to have the amount automatically typed on the work-sheet.

This invention is in the nature of improvements on the patent to Hart, of August 23, 1921, No. 1,388,257, and the patent to Ansart, of March 3, 1925, No. 1,528,390.

The machine disclosed in said patents has a built-in totalizer or register of predetermined denominational capacity, and usually includes a standard number of seven numeral dial-wheels for accumulating a total up to 99,999.99. To cooperate with a register of this capacity, denominational tabulating mechanism is provided having seven tabulating keys, and hence, the key of the highest denomination will release and arrest the carriage in position to condition the pin-bar of highest denominational order relatively to a numeral-key-actuated linkage, and any of the other denominational keys will position the carriage in proper denominational column predetermined by the denominational value of the numbers to be typed and computed. The register is usually placed at the lower front edge of the machine, and, as the numbers on the dials are comparatively small, it is easy for the operator to misread a digit, which, when once typed and accumulated, (subtractively) can only be checked by noting whether or not the register then displays a full complement of zeros.

At present in key-actuated computing machines which "clear" back to zero by direct subtraction or complementary addition, it is possible for an operator by mistake, to copy a wrong total, even though a correct total be shown in the totalizer, and then to proceed with a new computation without noting the error. Any digits remaining in the totalizer through such an error cause the next computation to show a wrong result, and in this manner a double error is made.

In the patents to Hart and Ansart above-mentioned, this defect is corrected by eliminating the manual operation of typing the total from the reading of the exposed register, and instead rendering the operation automatic through the release of spring-actuated type-bars which are selectively released by means under the control of the register-dials. The selecting devices are ready at all times to effect typing actuation of the numeral keys, but means carried by the carriage predetermine the denominational letter-space position where the actuation of the types becomes effective. Thus after a series of computing operations involving several computations, which give a resultant or total to be typed upon the work-sheet, the carriage is first set to the letter-space position of the highest denominational digit of the total read from the register. If this highest denominational digit is in the tens of thousands column, the carriage may be set to this position by hand, or automatically, by the depression of the tens of thousands tabulator-key to register the carriage, and actuate the jack of the same denominational order to condition the selective devices for a motor actuation, and after setting the carriage to the highest denominational digit-position, the subsequent successive typing of the digits of lower denominational orders becomes automatic seriatim. Both Hart and Ansart relieve the operator of typing the total, but in reading the denominational position of the digit of the highest order from a series of closely-positioned digit-dials, it is easy to misread the correct denominational value accumulated.

One feature of the present invention includes selective devices to cover a full computing zone, with means carried by the carriage to engage the selective devices seriatim and instead of employing a denominational tabulating mechanism to release and arrest the carriage at a predetermined denominational position within a computing zone, the total-key actuates a column-stop mechanism to release and always arrest the carriage at the highest denominational position in a computing zone predetermined by the deonminational scope of the register. Accoording to this feature the carriage is automatically positioned for the denomination corresponding to the register-wheel of highest denominational value. Provision is made to automatically operate the space-bar as stated, to letter-space the carriage step-by-step up to the denominational position of the first significant figure of the total, the mechanism automatically becoming operative to subsequently type upon the sheet the total amount entered in the totalizer. The operator has no register to read to predetermine the denominational stop-position for the carriage, but the depression of the total-key automatically calls into action a carriage-column-stop at the highest denominational position in the computing zone and the successive stepping of the carriage automatically picks up the typing positions of the next lower denominational digits in the register.

The total-key for each totalizer may, as stated, automatically set the machine to a subtractive state, so that the actuation of the numeral keys to type the total also sets up the value thereof, in the denominational pin-bars in complementary order so that at the end of the automatic typing, operation of the general operator will cause the set-up value of the pin-bars to restore their associated circuit-closing elements to clear all wheels to zero-positions. Thus by a single key actuation the operator is relieved of determining the denominational setting of the accumulated total, and the automatic actuation of the subtracting mechanism prevents any possibility of the total being added to itself upon typing the total.

If, for example, the accumulation on the dials were 00094765 the carriage would be arrested at the highest denominational position, the corresponding dial of highest denomination displaying a cipher, and as it is necessary in this automatic total-printer to print, after the first significant figure, the ciphers as well as the other digits 1 to 9, under ordinary conditions the three ciphers at the left of the total would be typed upon the work-sheet, which would be objectionable and confusing. As necessitated by this example the aforesaid mechanism is called into action automatically by the depression of the total-key to automatically actuate the space-bar for the three highest denominational positions indicated by the three ciphers and the carriage will be letter-spaced past said positions by the space-bar up to the position of the "9", which is the first significant digit thereupon by the automatically ensuing operation of the "9" key the automatic carriage-feeding control is switched from the space-bar to the control of the numeral keys. Eliminating the ciphers at the left of the digit of highest denomination, does not prevent the typing of a cipher within the total as the cipher within a total has an electric control over the cipher type-bar just the same as the other numerals. For example, if the total to be typed were 900000.00, the pressing of the total-key is effective to arrest the carriage at the highest denominational position, and connections are automatically made to type the "9", and in typing the "9", the cipher-typing elements are automatically made potentially effective to actuate the cipher-key-lever step-by-step down to the last cipher to be typed in the total. In this manner provision is made to automatically eliminate all ciphers to the left of the total, but automatically type ciphers that may be included at the right of the first significant numeral accumulated.

Other features and advantages will hereinafter appear.

In the accompanying drawings,

Figure 1 is a side view in sectional elevation of an Underwood-Hanson computing machine having the invention applied thereto. In this view all the mechanism is shown in its normal position.

Figure 2 is a fragmentary view of the computing register, showing the driving pin-bar and the contact wheel.

Figure 3 is a cross-sectional view through line 3—3 of Figure 2.

Figure 5 is a plan view showing the side plates of the machine and one of the totalizers and its associated contact block.

Figure 6 is a front view of parts of the totalizers showing the contact block in section and the relation of the contact wheels thereto.

Figure 7 is a cross-sectional view of the contact block through one of the contact bars.

Figure 8 is a cross-sectional view of the contact block showing the circuit through the "9" bar closed by the circuit-closing tooth of the register-gear.

Figure 9 is a fragmentary side view showing the switch for directing the current to the space-bar solenoid or to the "0" key solenoid.

Figure 10 is a view of the solenoid supporting plate, showing the adjusting screws for adjusting the movement of the solenoid plungers.

Figure 11 is a side view showing the means for releasing the total-key when the general operator is reciprocated.

Figure 12 is a side view showing the totalizer-gear and the contact block in position to effect operation of the "5" key.

Figure 13 is an enlarged side elevation showing the total-key mechanism and connections in their normal positions.

Figure 14 is a back view of the machine showing the general arrangement of the solenoids and operating mechanism therefor.

Figure 15 is a diagram showing the electric circuits leading to and from the contacts of the circuit-distributing block and to the solenoids.

Figure 4:
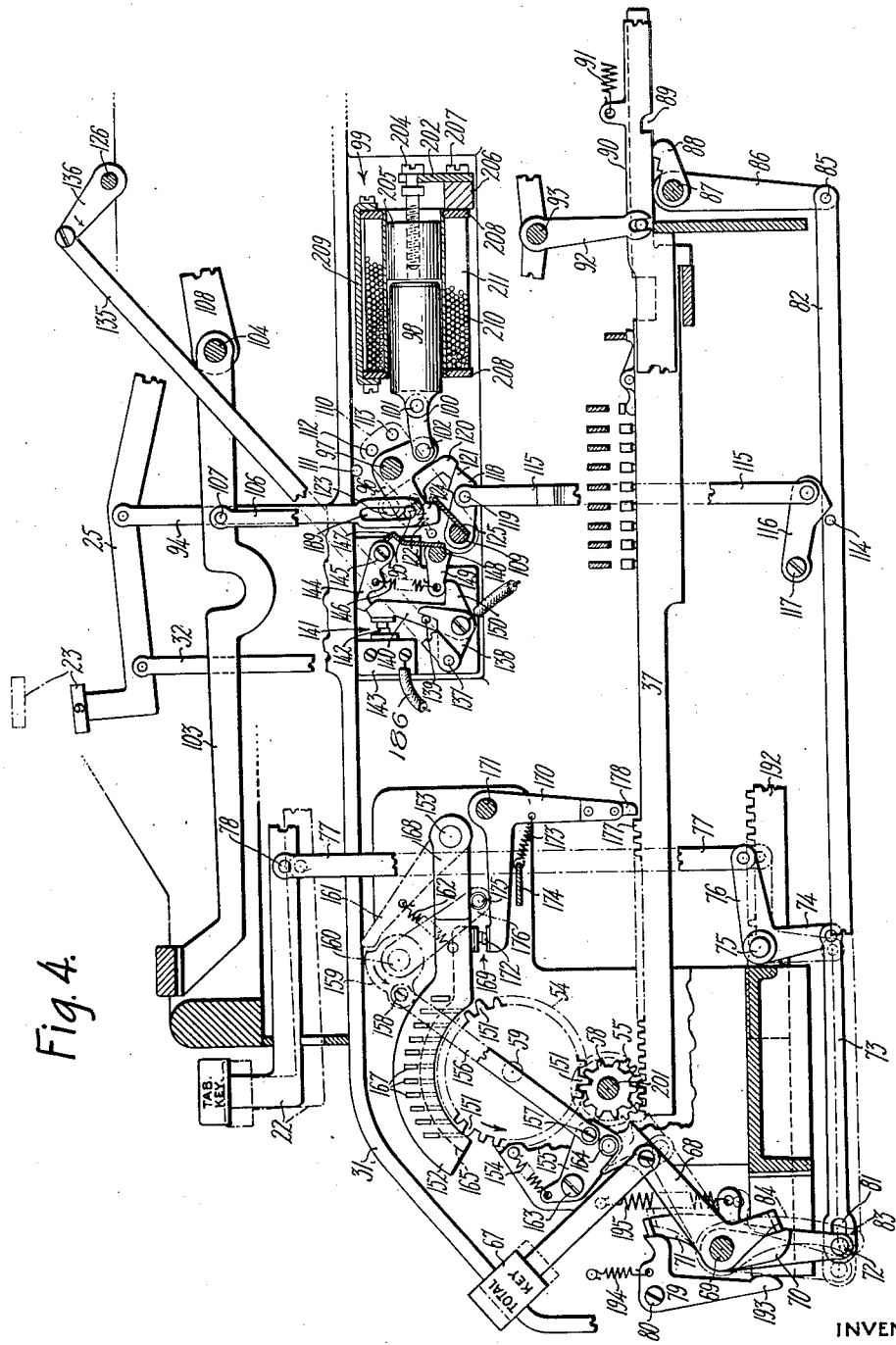
Figure 4 is a cross-sectional view of the computing mechanism showing the total-key and the "9" key in their depressed positions.

The usual manner of operating the Underwood-Hanson machine is to identify an entry by operating character keys 20, then to position a carriage 21 at a column-stop position by depressing a tabulator key 22 and finally to type an amount by depressing numeral keys 23. The numeral keys are effective to swing type-bars 24 which are operatively connected to key-levers 25 by means of bell-cranks 26. The key-levers are pivotally mounted at 27 and are held in their normal positions by means of springs 28 which also serve to restore the type bar trains. The type-bars strike on a platen 29 which is rotatably mounted on shaft 30 carried by the carriage 21.

In order that the amounts typed on the work-sheet may be computed in a computing mechanism enclosed in a casing 31 surmounted by the typewriter, each key-lever 25 is provided with a pendant or link 32, which extends downwardly and operates, by means of an associated shaft 33, a corresponding cross-bar 34 which forms part of a pin-setting frame generally indicated by the numeral 35. The cross-bars 34 are effective to depress pins 36 carried by pin-bars 37. However, in order that the pin-bar of proper denominational order may be moved to pin-setting position in the same denominational order that the numbers are typed on the work-sheet, there is provided mechanism for operatively connecting the carriage and the rack-bars. This mechanism includes, in addition to the tabulator-key 22, which is effective to elevate a tabulator-stop 38 in the path of a column-stop 39 carried by a cross-bar 40, a series of tappets 41 mounted on a bar 42. The tappets are swingable about said bar 42 and settable along a rack 42, and are normally dropped to ineffective position. Said tappets are elevated to effective position, when the carriage enters a computing zone by means of a selecting roller 44. The advancing movement of the carriage while in said zone is utilized for rocking seriatim jacks 45, which are pivotally mounted at 46 and depress associated links 47 which in turn are effective to swing levers 48 operatively connected to the pin-bars 37 by means of co-operating, transposing devices 49 and bell-cranks 50.

An amount is digitally indexed by depressing digit-pins of corresponding value in the pin-bars and then a general operator 51 is reciprocated either by means of a motor 52 or by means of a handle 53. This is effective to move, by means of the depressed pins, each pin-bar a distance corresponding to the respective numeral typed on the work-sheet.

In order that the distances moved by the pin-bars may be accumulated, there is provided a totalizer or register having a series of gear-wheels 54, to each of which a corresponding pin-bar 37 is connected by means of a pinion 55, a co-operating pawl 56, a ratchet 57, and an intermediate gear 58. The latter engages with the gear-wheel 54, which is loosely mounted on fixed shaft 59. By means of this arrangement the wheel 54 rotates in the direction indicated by the arrow, Figure 2, during the forward movement of the general operator, but remains stationary during the return stroke thereof. By means of the usual one-way driving connection the return movement only of the general operator is used to rotate a shaft 60 (see Figure 2), which, by means of special gears 61 and intermediate pinions 62, enables any wheel 54, through its connection with a wheel 65 having the carry-over tooth seen in Figure 2, to effect rotation of the wheel 54 of next higher denominational order one tooth ahead to thus carry the tens forward. The pinion 62 is loosely mounted on a shaft 63 and carries a carry-over wheel 64 designed to engage the special gear 65, upon which the pawl 56 is mounted by means of a pin 66.

When it is desired to type a total represented by the positions of the wheels 54, a total-key 67, which is normally in the position shown in Figure 1, is depressed to the position shown in dot-and-dash lines in Figure 4. This depression of the key 67 is first effective to operate the tabulator-key 22 to release and arrest the carriage at a column position for the numeral of highest denominational order within a computing zone. To this end, there is provided mechanism including a bell-crank 68 loosely mounted on a shaft 69 which is rocked when a lower extension of the bell-crank engages an arm 70 fast to the shaft. Said shaft carries a lever 71 which, by means of a pin 72, a link 73, and an arm 74 fast to a shaft 75, is effective to rock the latter to thereby depress the tabulating key by means of an arm 76 carried by said shaft 75, and a link 77 which is connected to a pin 78 carried by the tabulating key. The position of the key 67, shown in dot-and-dash lines, is only held until the carriage is arrested by the tabulator-stop 38 whereupon the key is partly let up in order that said stop may be retracted and the carriage restored to the control of the escapement mechanism. This partly let up position of the total-key 67 is shown in full lines in said Figure 4, in which it will be noted that the tabulator-key is already restored to its normal position and the total-key is held in a midway position by means of a pawl or bell-crank 79, which is pivotally mounted at 80. In order that the tabulator-key 22 may be operated independently of the total-key it is contrived to connect the pin 72 with the link 73 by means of an elongated slot 81, to thus provide a one-way operating connection.

Another function of the total-key 67 is to set the machine for subtraction in order that the amounts typed may be set in the pin-bars 37 and then, upon the operation of the general operator, the totalizer may be restored to its normal or zero position. To this end there is provided a link 82, which is connected by means of a stud 83 to an arm 84 fast to the shaft 69. This link extends backwardly and is connected at 85 to an arm 86 fast to a subtraction-setting shaft 87. The latter carries a pawl 88 which normally engages a notch 89, thereby holding a subtraction-setting bar 90 in the ineffective position shown in Figure 1 against the tension of an operating spring 91. The bar 90, when released, moves rearwardly to the position shown in Figure 4 to thereby set, by means of an arm 92, pivotally mounted on a shaft 93 and other mechanism, the setting frame 35 for subtraction. When the setting frame is set for subtraction depression of the numeral keys effects a complementary setting of the pins, in a manner fully described in the patent to Minton, No. 1,280,065 dated September 24, 1918.

Each numeral key is provided with a link 94 which extends downwardly and engages a pin 95 carried by a bell-crank 96 pivotally mounted on a shaft 97. Each bell-crank is connected to a plunger 98 of an associated solenoid 99 by means of a short link 100. The latter is secured respectively to the plunger and to the bell-crank by means of pins 101 and 102 Figure 4. By means of this arrangement, when a solenoid is energized, the plunger 98 is drawn into the solenoid, thereby rocking the bell-crank 96 and operating the type-bar to print, which is subsequently restored by means of the spring 28 when the current through the solenoid is cut off. It will be understood that there are eleven solenoids, that is, one solenoid for each numeral key including the zero key, and one for a space-bar 103. The general arrangement of these solenoids is shown in Figure 14 in which it will be noticed that they are of oval cross-section in order that comparatively large solenoids may be accommodated in the narrow spaces determined by the spaces between the numeral-key levers. The space-bar 103 is mounted upon a rock-shaft 104 having a finger 108 that is effective, upon depression of the space-bar, to operate an escapement-mechanism generally indicated by the numeral 105. The space-bar is connected with its associated solenoid by means of a link 106 which is connected to the space-bar at 107.

One of the features of this invention is that upon depression of the total-key, the carriage is automatically positioned for the numeral of highest denominational order and then the same is automatically letter-spaced to the denominational column of the first significant figure of the number to be typed. The reason for this is to prevent the typing of zeros in front of the first significant figure, which would be confusing. Ordinarily, if the numeral to be typed would correspond to the position of the wheels as illustrated in Figure 15, the number would appear thus, 000950 30, that is, a series of three zeros would be typed before the first signiflcant figure, which is "9". In order that these confusing zeros may be eliminated from the work-sheet it is contrived to provide a switch such as is illustrated in Figure 9. This is a two-way switch, that is, a switch which may divert the current from the space-bar-solenoid to the zero-key-solenoid, or vice versa. Although the structural features of this switch are immaterial it will be seen that the design herein illustrated includes a shaft 109, which carries a switch-plate 110 designed to bridge either two adjacent ones of three contact points 111, 112, 113. The shaft 109 may normally be in the position shown in Figure 1 but is swung to the position shown in Figure 13 upon operation of the total-key. The mechanism provided for this rocking of the shaft may include a pin 114 carried by the link 82, which pin elevates a link 115 by contacting with a cam face of an arm 116 pivotally mounted at 117. The link 115 extends upwardly and is connected to an arm 118, fast to the shaft 109, by means of a screw 119. In this manner, when the total-key is depressed the shaft is rocked so as to swing the switch-plate 110 to a position bridging the contact points 111 and 112 as shown in Figure 15, thereby closing certain circuits to the space-bar solenoid. The shaft 109 is held in this position by means of a retaining pawl 120, which is held in engagement with the end 121 of the arm 118 by means of a spring 122 Figure 13. The retaining pawl 120 may be mounted at the side of the machine by means of a screw 123.

As soon as any one of the solenoids 99 for typing the figures "1" to "9" is energized to operate its associated type-bar, the corresponding numeral bell-crank 96, provided with a finger 124, strikes a universal plate 125 to thereby rock the shaft 109, thus swinging the plate 110 to bridge the contact points 112 and 113. This is effective to divert the current to certain circuits to render the zero-key solenoid effective when the latter is thereafter required to operate. The shaft 109 is held in this latter position by means of pawl 120 as shown in Figure 4.

In order that the type-bar 24 may be released immediately upon striking the platen, advantage is taken of a rocking movement imparted to a shaft 126 by the actuation of the escapement-mechanism 105. It is well known that upon swinging the type-bars a heel 127 thereof strikes a universal bar 128, which moves rearwardly to permit an escapement-wheel 129 to rotate one tooth-space. The universal bar is connected to a dog-rocker 130 rockable about an axis 131. Said rocker 130 is provided with an extension 132, which, by means of a pin-and-slot connection 133, engages with another arm 134 carried by the shaft 126. This mechanism is all mounted in the typewriter-frame and is connected with the computing mechanism by means of a link 135 carried by an arm 136 fastened to the shaft 126. Said link extends downwardly and forwardly, and is connected at its lower end by means of a pin 137 to a lever 138, which is effective to strike a pin 139 carried by a switch-arm 140 Figure 4. Through this train of connections a switch 141 is closed when each numeral-type-bar strikes the platen. The switch is effective to short-circuit the main line current and thus de-energize the solenoid and restore the type-bar train. One of the switch-contact points is on the arm 140 and another contact point 142 is carried by an insulated plate 143 fastened to the side of the machine. In order that the switch-arm 140 may be resiliently held in its effective or ineffective position, there is provided a retaining pawl 144 pivotally mounted at 145 and held against the end of the arm 140 by a spring 146. The closing of the switch 141 short-circuits the lines 174 and 186 and de-energizes the solenoid to release the bell-crank 96, to be swung clockwise by the key-lever-restoring spring 28. As a result the finger 124 of said bell-crank 96 strikes a universal plate 147 carried by a shaft 148 and rotates the latter, which in turn by means of an arm 149 designed to engage a rear extension 150 of the switch-arm 140 withdraws said arm 140 from the contact point 142. The shaft 148 is held in its normal position by the action of the spring 146. It will be understood that this short-circuiting of the current is momentary since the restoration of the type-train, caused by closing the switch 141, in turn causes said switch to be almost immediately reopened. The carriage has meanwhile moved to its next position, thereby opening the circuit to the active solenoid and closing the circuit through the solenoid called into action for the next adjoining denomination as will be explained later.

One of the functions of the total-key is to swing into contact with special circuit-closing or brushing teeth 151 of the wheels 54, a contact or circuit distributing block 152 carried by a shaft 153. This is done by permitting a spring 154 to swing an arm 155 downwardly to thereby draw on a link 156 which is connected by means of screws 157 and 158 to said arm and to a cam 159 fast to a shaft 160. The cam 159 is engaged by an arm 161 fast to the shaft 153 and upon rotation of the cam the arm 161 is moved into a clearance recess in the periphery of the cam by the action of a spring 162 and which is effective to release the contact block 152. The arm 155 is pivotally mounted on a stud 163 and is operatively connected with the bell-crank 68 by means of a roller 164 rotatably mounted on said arm to follow the contour formed at the end of the arm of said bell-crank as best seen in Figure 11.

Said contact block 152 is normally in the position shown in Figure 1, but is lowered to contact with the special teeth 151 of the wheels 54, as shown in Figure 4, upon depression of the total-key 67. The contact block is made of molded, insulating material, and has a series of denominational conductor bars 165 inserted in the block. These bars 165 and the contact block 152 are curved to conform with the rotary path of the special brushing teeth 151. There is one of these bars for each wheel 54, and each bar is provided with a contact point 166, see Figure 8. In addition to said bars 165, there is provided another set of conductor bars 167 also inserted in the block and running parallel to the shaft 59. The set of bars 167, disposed in arcuate arrangement around the path of the special teeth 151, represents digit-values, while the bars 165 represent denominational orders. It will be noted by reference to Figure 6, in which a cross-sectional view of the block is shown, that any one of the bars 167 formed as shown in Figure 6 may be selectively connected with any of the bars 165. This connection is made by means of the special brushing teeth 151, each of which is made longer than the regular teeth and wide enough to bridge the gap between the corresponding two bars 165 and 167. From the foregoing, it may be understood that the position of a circuit-closing tooth 151 of the wheels 54 will determine which pair of bars 165 and 167 will be short-circuited. In Figure 8, one of the wheels 54 is shown in a circuit closing position corresponding to the numeral "9", while in Figure 12 another tooth 151 has been rotated to the position corresponding to the numeral "5". The construction of the block 152 is improved by providing metal plates 168 which serve as a means for securing the block to the shaft 153.

When the contact block is lowered to its effective position, the connections between the bars 167 of proper digit-value and the denominational bars 165 are immediately made, but in order that the numbers may be typed one at a time, according to the denominational position of the carriage, there is provided a series of pairs of contacts indicated generally by the numeral 169 Figures 1 and 4, each pair including the contact point 166. There is one contact pair associated with each pin-bar 37 and each contact pair includes a bell-crank 170 pivotally mounted on a cross-bar 171 and carrying a contact point 172 designed to contact with the contact point 166 carried by the corresponding bar 165. Springs 173 may serve as means for conducting the current from the insulated terminal bar 174 to the bell-cranks 170 and also to urge the latter in their circuit-closing positions. These contact-points 166 and 172 are normally open as shown in Figure 1, because an insulated bail 175, mounted by means of arms 176 on the shaft 160, holds them against the tension of the springs 173, but upon depression of the total-key said bail is swung upwardly to the position shown in Figure 4, to thereby permit the springs 173 to close said contact-points under control of the pin-bars.

To prevent simultaneous closing of all the contact-points 166 and 172 upon depression of the total-key, it is proposed to connect each bell-crank 170 with a corresponding pin-bar 37 associated therewith. To this end, each pin-bar is provided with a projection 177 engaging a fiber extension 178 which insulates the bell-crank 170 from the pin-bar. This holds all the contact-points open except when the one associated with a pin-bar, moved to pin-setting position by the carriage, is effective to close the circuit through the solenoid corresponding to the digital position of the gear 54.

Referring to Figure 15, it will be noted that the current enters through a main line 179 and passes through a resistance 180; then follows a lead 181 to a switch 182, which is closed upon depression of the total-key, and thence to the terminal bar 174 through a lead 183. The current then passes through the contacts 172 and 166 of the switch 169 which, when closed by operation of the pin-bars 37, directs the current to the solenoids and thence to the return circuit 186. In this diagram it is assumed that the carriage has been arrested at the highest denominational position within the computing zone, and that the special brushing tooth 151 of the wheel 54 contacts with the zero conductor 167a. This zero conductor 167a is like the conductors 167 and is connected with the contact point 112 by means of a lead 184. In the diagram the plate 110 is effective to divert the current to the space-bar solenoid by contacting also with the contact point 111 having a circuit 185 connecting the contact point 111 with the space-bar solenoid, and thence to a return circuit 186. This is effective to automatically letter-space the carriage, but, since there are three blanks spaces to be jumped by the carriage, the operation is repeated until the carriage reaches the fourth position, in which case the "9" is to be printed. The latter is printed in a similar manner, except that instead of energizing the space-bar solenoid, the "9" key solenoid is energized because the wheel 54 corresponding to said fourth position has the tooth 151 standing at "9". The circuit connecting the "9" key solenoid with the bar 167 of similar digit-value is indicated by the numeral 187. Concomitantly with the typing of "9" the switch-plate 110 is automatically shifted as previously explained, the zero solenoid thereby becoming potentially effective. The other numerals representing the amount to be typed are successively typed on the work-sheet because, although all the bars 165 and 167 are simultaneously joined when the circuit distributing block is lowered, the contacts 169 are successively closed to complete and reopen the circuits to the solenoids seriatim as the carriage is letter-spaced. In the diagram the circuits for joining the digit-bars 167 and their respective solenoids are all, except the "9", indicated by the numeral 188.

Each time a numeral key is actuated by energizing the solenoid associated therewith, the same is effective to set a corresponding pin in the pin-bar 37 of a denominational order corresponding to the position of the carriage. This setting of the pins is accomplished in the same manner as when a type-bar is actuated by manual depression of a numeral type-key when the carriage is in a computing zone, except that when the type-key is manually operated, the solenoid-plunger is not actuated because of an elongated slot 189 in each of the links 94 which provides a one-way connection between the link 94 and the bell-crank 96. After typing the last numeral, that is, when the carriage letter-spaces from the position corresponding to the numeral of lowest denominational order, the motor 52 is automatically tripped by means of linkage 190 controlled by the tabulating stop 39. Said linkage is effective in the usual way to actuate a clutch-member 191 to thereby reciprocate the general operator 51. When the latter reaches its forward extreme position, the forward end of a driving rack 192 for the general operator strikes a lower extension 193 of the bell-crank 79 to thereby rock the same on its supporting shaft against the tension of a spring 194 and release the total-key which is restored to its normal position by a spring 195. The extreme position of the general operator is illustrated in Figure 11, in which the total-key mechanism is shown in its normal or released position.

During the return movement of the general operator a pin-restoring platform 196 is moved upwardly by means of linkage indicated generally by the numeral 197 and controlled by a pawl 198 carried by the general operator.

In order that the pin-bars 37, moved seriatim to pin-setting position when urged by the controlling mechanism associated with the carriage, may return to retracted positions, each rack-bar is provided with a spring 199 which draws the bars rearwardly away from the restoring bar 51 carried by the general operator. These springs are very light but have to overcome the tension of the springs 173 which operate the bell-cranks 170. In order to facilitate complete restoration of the pin-bars by the springs 199 after typing a total, the bail rod 175 is effective to positively operate all the bell-cranks 170 to thereby remove the tension of the springs 173 from the pin-bars.

The gear-wheels 54 serve as means for determining the digit-value to be typed while the carriage determines the denominational position of the digit. Said wheels 54 are operatively connected with pin-bar 37 of corresponding denominational value (Figure 2) by means of the intervening pinion 58 meshing therewith and the pawl 56 which is held in engagement with the ratchet 57 by means of a spring 200. The ratchet is assembled together with the pinion 55 which meshes with the pin-bar 37 and is rotatably mounted on a shaft 201 which carries, also, rotatably mounted thereon, the pinion 58.

In order that the impact of the magnetically-operated type-bars may be regulated, the solenoids are of the armature plunger type that cooperate with an adjustable magnetized core. To this end there is provided a back cross plate 202 having a series of slots 203, in line with the axes of the solenoids. Each slot is designed to receive a collar-screw 204 for adjusting the respective core 205 to its plunger 98, to thereby increase or decrease the air gap and regulate the effective pull of the solenoid.

The plate 202 is secured to a solenoid-supporting member 206 by means of screws 207 and a tie-plate 209 ties the heads 208 of the solenoids together and serves as a return path for the magnetic flux. The heads 208 of each solenoid are secured together by a non-magnetic core 210 to form a spool for receiving the winding 211.

Each register is mounted between two side plates 212 which confine it. These plates are secured to the base of the machine. The digit-conductor-bars 167, 167a and the bar 167b are electrically connected with the corresponding bars of the other registers by means of springs 213. These springs not only provide effective electrical conductors but provide a flexible connection between the contact blocks so that any one of the blocks may be moved to effective position independently of the others.

The computing machine may include a computing mechanism having an accumulative capacity of 999999 99 and the letter-space position for the highest digit may be at 60 on the usual carriage scale. A tappet 41 is adjusted to the 60 position on the bar 42 to determine a nine letter-space computing zone, and the carriage is shifted at the right hand of this zone position.

The full depression of the total key 67 to the dotted position in Figure 4 sets in motion several trains of mechanism; first, the switch 182 is constructed and is operated by the key in any well-known manner, as for example the total-key-operated switch of the aforesaid Hart Patent No. 1,388,257, to close the circuits 181 and 183 to the bar 174 and to the whole series of bell-cranks 170; and, second, the bell-crank 68 rocks upon the shaft 69, to rock the arm 70 fixed to the shaft, to rock the lever 71 to the dotted position, Figure 4, which tensions the spring 195, pulls upon the link 73 to rock the arms 74—76, to pull the link 77, to depress the tabulator-lever 22, to lift the stop-bar 38, to release the carriage to its spring-motor, and project the stop 38 into the path of the advancing carriage-stop 39 to arrest the carriage a little in advance of the exact 60 position of the scale. Upon release of the key 67 by the finger, after the arrest of the carriage in the desired column, the key is partially restored by the spring 195 until checked by the pawl 79 which has moved to a position to intercept the lever 71 and cause the arrest of the key 67 at the full-line position, Figure 4, to restore the tabulator-key 22 and restore the carriage to the control of the escapement-mechanism 105 which gives to the carriage a movement of approximately one-half a letter-space distance, for purposes to appear. The rocking of the crank 68 releases the roller 164 and the arm 155 responds to the spring 154, to pull the link 156, to rock the cam 159, to release the arm 161 to a spring 162, to rock the shaft 153 and drop the contact-block 152 to the position of Figure 4. The rocking of the shaft 69 vibrates the arm 84 forwardly to draw upon the link 82, to rock the shaft 87 and pawl 88, to release the subtraction-bar 90 to its spring 91 and simultaneously the pin 114 on the link 82 may cam the arm 116 to lift the link 115, to raise the arm 118, to interlock with the holding pawl 120, to rock the shaft 109 and rock the switch-plate 110, to cover the two terminal-pins 111, 112, as shown at Figure 15, to close the two circuits 184 and 185 to the space-bar solenoid.

It will be assumed that the total accumulated by the wheels 54 is 950 30, and the reading of the wheels by the relative positions of the teeth 151 would disclose a linear series of digits 000950 30.

It will be remembered that the carriage is moved a half letter-space as it is released by the tabulator-stop 38, due to the readjustment of the carriage-escapement dogs, and this movement is sufficient to shift the tappet under the jack 45 of highest denominational order, to vibrate the jack, operate the transposition devices 49, to vibrate a bell-crank 50, to move the pin-bar of highest denomination forwardly, to register the pins 36 under the pin-setting bars 34, to release the associated bell-crank 170 to its spring 173, and close the corresponding contacts that constitute the switch 169. Because a tooth 151 is at the zero-bar position of the block and the switch-plate 110 bridges the contact pins 111, 112, the closing of the contacts 169 automatically completes the circuits through the space-bar solenoid, which actuates a bell-crank 96, to pull upon the link 106 and depress the space-bar lever 103, to actuate the carriage-feeding mechanism and simultaneously rock the shaft 126, arm 136, and the link 135, to rock the switch-arm 140, to close the switch 141 just in advance of the full downward sweep of the space-bar 103. The effect of closing the switch 141 is to shunt the solenoid-circuits, to demagnetize the space-bar solenoid, and release its plunger 98 to allow its bell-crank 96, link 106 and space-bar to be restored by the usual space-bar spring.

In this latter step in the operation, the switch 141 is caused to be opened by means of the modified finger 124 striking the universal plate 147 to rock the shaft 148 to withdraw the switch-arm 140.

The escapement-dogs are adjusted to effect a carriage let-off immediately after the type-impact, and the carriage has effected a letter-space movement before the space-bar has hardly started to rise from its depressed position, and this movement of the carriage releases the jack of highest denomination and operates the jack of next lower denomination, which releases the pin-bar 37 of the highest denomination to its restoring spring 199, and vibrates its bell-crank 170 to open the associated switch 169. The next adjoining jack-operated pin-bar 37 operates to vibrate its bell-crank 170 to close the circuit through the contact bar 165 of next lower denomination to again actuate the space-bar solenoid to letter-space the carriage. It will be noted that the bell-crank 96, operated by the space-bar solenoid, has its finger 124 modified so that it cannot reach the universal plate 125, yet is effective to actuate the universal plate 147, and hence the shaft 109 has not changed its position and the switch-plate 110 still covers the two terminals 111 and 112. Said bell-crank 96 for the space-bar solenoid, however, on its return to normal position after each space-bar operation will therefore cam the plate 147, to rock the switch-arm 140 and open the switch 141, to again make the space-bar solenoid potentially effective.

As there are three zeros in front of the first significant character 9 of the total, this same operation will repeat itself three successive times to automatically letter-space the carriage, and in letter-spacing the carriage the third time, the operation of the next jack-operated pin-bar closes the switch 169 to the bar 165, and the long tooth 151 of the next wheel 54 is aligned to close the circuit to the nine-key solenoid, which operates to pull upon a link 94 connected to the nine-key-lever 25 to type the numeral 9. The bell-cranks 96, connected to operate the numeral-keys "0" to "9", each have the lip 124 as shown, and therefore at the end of the down stroke of the nine-key-lever 25, the lip 124 engages the plate 125 to rock the shaft 109, break its interlock with the pawl 120 and shift the switch-plate 110, to uncover the pins 111 and 112 and cover the pins 112 and 113, to close the two circuits 184 and 188 to the zero-key solenoid for subsequent use. The nine-key solenoid and its plunger operate, as already described, to open the switch 141, letter-space the carriage, open the switch 169 to the nine-key solenoid and close the switch 169 of the next adjoining bar 165, which is short-circuited to its companion bar 167 by a long tooth 151 at the "5" position, which closes the circuits to the five-key solenoid, which operates to type the numeral 5. The next character is a zero, but, as the circuit is closed through the pins 112 and 113 and the long tooth 151 is at the zero position relative to the circuit-distributing block 152, the closing of the contacts 169 by the letter-spacing of the carriage immediately energizes the "0" key solenoid to type the "0".

Referring to Figure 6, it will be noted that the wheel 54 and pinions 55 and 58 at the decimal-point position of the series of wheels are to be omitted, and in Figure 15 it is shown that the circuit 167ᵇ has a permanent connection to the decimal-position bar 165. The corresponding pin-bar 37 is a dummy, whose only function is to release, when the carriage reaches the decimal position, its bell-crank 170 to close the contacts 169 and close the circuits 174—167ᵇ—185 to the space-bar solenoid. Thus there appears in the printed total a decimal space which points off the dollars from the cents.

The carriage has been letter-spaced to the decimal position by the typing of the last "0", and the jack-operated dummy pin-bar 37 releases its bell-crank 170 to close the two circuits 174 and 167ᵇ to the space-bar solenoid which operates to letter-space the carriage. The next two letter-spacings of the carriage operate, as already described, to selectively type the numerals "3" and "0" to complete the printing of the total.

In the event that the highest digit of the total to be typed is any numeral from 1 to 9, and although the switch-plate 110 has been shifted by the setting of the subtraction-bar 90 to cover the terminal-pins 111 and 112 to close the circuits 185 and 167ᵇ to the space-bar solenoid, said space-bar solenoid remains inactive because the long tooth 151 has been advanced or set to some 1 to 9 position along its bar 167 to selectively establish the circuit for the corresponding 1 to 9 key solenoid to type. In typing any 1 to 9 numeral, the associated lipped bell-crank 96 operates to engage the universal plate 125 and shift the switch-plate 110 to cover the pins 112 and 113 to close the circuits 167ᵃ—188 to the zero-key solenoid to subsequently type any zero that may occur in the total to be typed.

The typing of the numerals for the total have set up their pin values subtractively upon the pin-bars 37, and the cycling of the general operator therefore restores the wheels 54 to normal positions where a tooth 151 of each wheel 54 is aligned to zero position opposite the gap separating the contacts 165 and 167ᵃ. In this cycling operation the forward stroke of the general-operator rack-bar 192 strikes the bell-crank 79 to remove the interlocking trip-end thereof from the rear of the lever 71, which releases the associated parts to the tension of the spring 195, to restore the total-key, to cause the bell-crank 68 to cam the roller 164, to vibrate the arm 155, and, through the link-connection 156, rock the cam 159, to lift the arm 161, to rock the shaft 153 and raise the circuit-distributing block above the rotary field of the long teeth 151 of the wheels 54. The return movement of the general operator is effective in the usual manner to restore the subtraction-bar to its normal position, and the whole computing mechanism is set up for an additive computation.

In the diagram at Figure 15, as many of the additional solenoids may be provided as desired. For example, an additional solenoid may be operated by the tabulating key 22, or one may be operated by the total-key 67, since it is not necessary to keep the circuits closed preparatory to starting the cycling operation by the total-key, nor during the finger-operations of the digit-keys, nor to close them at any time except as described, viz., during the automatic typing of the total. Such switches and solenoids may be inserted as desired for the purpose of the invention, as, for example, the circuit 181, 183 may have any proper number of switches. Any convenient use may be made of additional switches as, for example, one may be controlled by the cycling handle 53, since the circuit 183, 181 does not need to be kept closed during the operation of the general operator, as no typing is done at that time.

Variations may be resorted to within the scope of the invention, and portions of the improvements may be used without others.

Having thus described my invention, I claim:

1. In a combined typewriting and computing mechanism, the combination of a series of total-wheels settable to represent a decimal-fraction, printing devices, a carriage, an electrically-operated spacing device for the carriage, a circuit-closing device under control of the total-wheels to select the printing devices in accordance with the figures of a number entered in the total-wheels, and a contact device for the spacing device under control of the carriage to connect the spacing device to function in decimal-point position of a total, to thereby provide a space at decimal-point position.

2. In a combined typewriting and computing mechanism, the combination of electrically-operated numeral-printing devices, a series of total-wheels, each wheel having a multiple of ten teeth and every tenth tooth thereof being elongated to extend beyond the periphery of the other teeth, a denominational series of switches, means for closing said switches in denominational order, and contact devices arranged to contact with an elongated tooth on each of the total-wheels to thereby establish, in co-operation with said switches, electrical connection for the operation of the printing devices.

3. In a combined typewriting and computing mechanism, the combination of a series of total-wheels, each having a multiple of ten teeth and every tenth tooth being elongated to act as a contact, contact devices for co-operating with the contact teeth of the total-wheels, and means to bring said contact devices and contact teeth into contact.

4. In a combined typewriting and computing mechanism, the combination of numeral-typing keys and a carriage, a series of solenoids, totalizing mechanism including selective circuits to selectively actuate the solenoids to cause the numeral-keys to print, upon the closing of denominational circuits by the carriage, and a circuit-closing device under control of the numeral-keys to shunt the solenoid-circuit after a key has been actuated to print, to thereby deenergize a solenoid and release the key to return to normal position.

5. In a combined typewriting and computing mechanism, the combination of a totalizing mechanism, a set of numeral-printing devices, a contact device for co-operating with the totalizing mechanism to control the actuation of the printing devices, said contact device including contacts representing the various decimal-orders, a carriage, means under control of the carriage to connect the decimal-order contacts, a total-key, and means including a bail under control of the total-key to lock the decimal-order contacts against actuation when the total-key is in normal position and to release them for actuation when in set position.

6. In a combined typewriting and computing mechanism, the combination of a series of total-wheels, a set of electrically-operated members typing electrically selectable by said total-wheels for printing totals, a carriage, an electrically-operated spacing device for the carriage, a series of contacts representing the denominational orders and complementing said total-wheels for closing a circuit to thereby actuate the typing members and the spacing device, and pin-bars under control of the carriage to close the contacts in succession from highest to lowest denominational order.

7. In a combined typewriting and computing mechanism, having, in combination, electrically-operated numeral-printing devices, a contact block including denominational-order-contact members and digit-value-contact memebrs, and means to select for contact such of the denominational-order-contact members and digit-value-contact members as represent a number, to thereby induce actuation of the numeral-printing devices in accordance with the respective digit-value-contact members.

8. In a combined typewriting and computing mechanism, having, in combination, a register having wheels settable to represent a number, a set of electrically-operated typing members representing the numerals "0" to "9", and a contact device having open contacts arranged in pairs and each pair co-operating with said wheels for selecting the typing members to be operated in accordance with the position of said wheels.

9. Means for controlling electromagnetically-operated type-keys, including a register having a series of denominational wheels, each wheel having a multiple of ten teeth, every tenth tooth being longer than the other teeth, a contact block of insulating material, having a series of denominational and digit bars, said bars being arranged to be short-circuited by said longer teeth, and means including a series of denominational switches operable seriatim automatically and co-operating with the short-circuited bars for controlling the operation of the type-keys one after the other from the highest to the lowest denominational order.

10. An invisible register for a computing mechanism including pin-bars, denominational wheels associated with said bars, a one-way connection between the bars and the wheels to afford rotation of the wheels during the forward movement of the bars only, and a contact block co-operating with said wheels, said block having denominational and digit bars and the block-bars being connectible by contact devices carried by said wheels.

11. In a combined typewriting and computing mechanism, the combination of a register and register-driving mechanism including pin-bars, a series of numeral-type bars, a series of electromagnetic coils selectable by said register preparatory to operating said type-bars, means released by the register pin-bars for energizing the selected coils to operate the type-bars to type, and means for automatically de-energizing said coils when the type-bars strike the platen, to thereby permit the return movement of the type-bars.

12. In a combined typewriting and computing mechanism, the combination of numeral-type bars, a platen, a carriage therefor, a letter-spacing mechanism for said carriage, electromagnetic devices for operating the type-bars, an electro-magnetic device for operating the letter-spacing mechanism, a register for accumulating the amounts typed by said type-bars, and means including a total-key operatively connected for automatically letter-spacing the carriage to a letter-space position predetermined by a significant digit of the total, and then automatically typing the successive digits accumulated in said register.

13. In a combined typewriting and computing mechanism, the combination of a carriage, numeral-type bars, electro-magnetic devices for operating said type-bars, means for accumulating the amounts typed by said type-bars, including a series of denominational wheels, contact devices carried by said wheels, and means co-operating with said contact devices for selectively closing an electrical circuit to such of the type-bar-operating devices as correspond to the various numerals of the amount accumulated in said wheels.

14. In a combined typewriting and computing mechanism, the combination of a series of settable total-wheels, electrically-operated devices each operable to print a number, a circuit-distributing device for said printing devices including a series of decimal-order circuits and a series of digit-value circuits, and circuit-closing means under control of the total-wheels operative to establish electrical connection between the decimal-order and digit-value circuits to thereby select for operation the printing devices corresponding to the positions of the total-wheels.

15. In a combined typewriting and computing mechanism, the combination of total-wheels settable to represent a decimal-fraction, electrically-operated printing devices each operable to print a numeral, a carriage having a computing zone, an electrically-operated letter-spacing device for the carriage, a series of conducting members arranged to represent the various denominational orders, a series of digit-value-conducting members, means under control of the total-wheels to establish electric connection between the decimal-order and the digit-value-conducting members to thereby select for operation printing devices corresponding to a total, and a special contact member for the spacing device selectively operable to separate the typed total in denominational groups of numerals by non-typed letter-spaces.

16. In a combined typewriting and computing mechanism, the combination of a carriage having a letter-space feed, numeral-type bars including a zero-type bar, mechanism for accumulating in a register amounts typed by the numeral-type bars, means for automatically positioning the carriage at a computing zone and for successively typing upon a work-sheet the total accumulated in the register upon depression of a total-key associated therewith, said means effective for automatically letter-spacing the carriage within a column position to the position of the significant digit of highest denominational order of the total to be typed, said means including a space-bar for the carriage-feed, electromagnetically-operated means for said bar, and a switch for conducting an electrical current through said electromagnetically-operated means upon depression of the total-key.

17. In a combined typewriting and computing mechanism, the combination of a carriage having a letter-space feed, numeral-type bars including a zero-type bar, type-bar-operating means, a totalizer, mechanism for accumulating in said totalizer amounts typed by the numeral-type bars, means for automatically positioning the carriage at a computing zone and for successively typing upon a work-sheet the amount accumulated in the totalizer upon depression of a total-key associated therewith, said last means effective for automatically letter-spacing the carriage within a column position to the position of the significant digit of highest denominational order of the total to be typed, said last means including a space-bar for the carriage-feed, electromagnetically-operated means for said bar, jointly controlled by said totalizer and carriage, a switch settable for conducting an electrical current through said electromagnetically-operated means upon depression of the total-key, and means for automatically actuating said switch to switch the electrical current from the space-bar-operating means upon the typing of the first significant figure of the total, to thereby render the zero-type-bar-operating means potentially effective.

18. In a combined typewriting and computing mechanism, the combination of a carriage and a platen for carrying a work-sheet, numeral-typing instrumentalities, a mechanical register having a mechanical carry-over mechanism, means for mechanically accumulating in said register the amounts typed on the work-sheet, a total-key for said register, and means controlled by said total-key for automatically typing on the work-sheet the amounts accumulated in said register, including a series of automatically operating electromagnetic type-operating devices under the joint control of the register and carriage.

19. In a combined typewriting and computing machine, the combination of numeral-typing devices, a carriage, a mechanism for letter-spacing the carriage, a register having total-wheels, a total-key operable to tabulate the carriage to a computing zone, and means set in operation by the carriage at the tabulating thereof, for automatically letter-spacing the carriage and concomitantly printing the total that has been accumulated in the register, said spacing and printing means including automatically operating electromagnetic devices under the control of the total-key of the carriage and of the total-wheels to solely operate the letter-spacing mechanism according to those total-wheels which register zeros ahead of the first significant figure of the total, and also including electromagnetic type-operating devices under the control of the register and carriage automatically called into action when said first significant figure is to be typed.

20. In a combined typewriting and computing machine, the combination of numeral-typing devices, a carriage, a mechanism for letter-spacing the carriage, a register having total-wheels, a total-key operable to tabulate the carriage to a computing zone, and means set in operation by the carriage at the tabulating thereof, for automatically letter-spacing the carriage and concomitantly printing the total that has been accumulated in the register, said spacing and printing means including automatically operating electromagnetic devices under the control of the total-key of the carriage and of the total-wheels to solely operate the letter-spacing mechanism according to those total-wheels which register zeros ahead of the first significant figure of the total, and also including electromagnetic type-operating devices under the control of the register and carriage, effective to start printing automatically at the highest denominational digit in the register, and to terminate the sole operation of the letter-spacing mechanism.

21. In a combined typewriting and computing machine, the combination of numeral-typing devices, a carriage, a mechanism for letter-spacing the carriage, a register having total-wheels, a total-key operable to tabulate the carriage to a computing zone, and means set in operation by the carriage at the tabulating thereof, for automatically letter-spacing the carriage and concomitantly printing the total that has been accumulated in the register, said spacing and printing means including automatically operating electromagnetic devices under the control of the total-key of the carriage and of the total-wheels to solely operate the letter-spacing mechanism according to those total-wheels which register zeros ahead of the first significant figure of the total, and also including electromagnetic type-operating devices under the control of the register and carriage, effective to start printing at the highest denominational digit of the register and to automatically shift the electromagnetic operation of the typing devices to the control of the register and carriage only.

22. A combined typewriting and computing mechanism having, in combination, a series of settable numeral-wheels, a carriage, typing members representing numerals "0" to "9", and means under control of the numeral-wheels operative to actuate the typing members in accordance with the digit represented by said wheels and to successively position the carriage in accordance with the denominational value of each digit, said means including a series of automatically operating electromagnetic type-operating devices under the joint control of the numeral-wheels and carriage.

23. In a combined typewriting and computing mechanism, the combination of a carriage, a register having numeral-wheels, numeral printing circuits, circuit-selecting devices under the control of the numeral-wheels and carriage to select digit-types, electromagnetic means included in said circuits to cause the selected types to print, and electromagnetic spacing devices for the carriage under joint control of said carriage and numeral-wheels, including a circuit that is closed by the carriage to advance the carriage.

24. In a combined typewriting and computing mechanism, the combination of a series of total-wheels, electrically-operated printing devices having open circuits, and a circuit-closing contact-device under control of each total-wheel to select a printing device in accordance with the value of a digit presented on a total-wheel.

25. In a combined typewriting and computing mechanism, the combination of a denomination-determining carriage, a series of total-wheels, a series of numeral-type members, a series of solenoids to actuate the type-members having open circuits, a series of denominational contact devices controlled by said carriage, and a circuit-closing contact-device under control of each total-wheel to select a solenoid for operation, to print, under the joint control of said total-wheels and carriage, the same value as the digit presented on a total-wheel.

26. In a combined typewriting and computing mechanism, the combination of a series of total-wheels, a carriage, an electrically-operated letter-spacing device for the carriage having open denominational circuits, a tabulating device for the carriage, a total-key, means under control of the total-key to tabulate the carriage, and circuit-closing means, including contacts controlled by said wheels and total-key, and also including a denominational series of contacts operable by the carriage at its tabulated position to successively feed the carriage a predetermined number of letter-spaces.

27. In a combined typewriting and computing mechanism, the combination of a traveling carriage, a series of numeral-keys including a zero-key, a letter-spacing mechanism for the carriage, said letter-spacing mechanism being controlled by the numeral-keys, a space-bar for independently controlling said letter-spacing mechanism, a tabulator-key for positioning the carriage, a totalizer for accumulating amounts typed by said keys, a total-key, and mechanism controlled by said total-key for automatically typing the amounts accumulated in said totalizer upon actuation of said total-key, said last-mentioned mechanism including an electromagnetic coil for operating each key, an electromagnetic coil for operating the space-bar, and circuit-controlling means selectively closed by the totalizer and by the spacing of the carriage to select for typing in spaced denominational order the digit-values of numbers accumulated in the totalizer.

28. In a combined typewriting and computing mechanism, the combination of mechanism having an accumulating totalizer, numeral-typing members, a carriage, total-taking mechanism, and means under control of the total-taking mechanism, to position the carriage for the printing of an accumulated total in a computing zone and subsequently select for operation the numeral-typing members representing the total accumulated, said means including automatically operating electromagnetic type-operating devices under the joint control of the totalizer and carriage.

29. In a combined typewriting and computing mechanism, the combination of an accumulating totalizer, including a series of wheels, electrically-actuated numeral-printing devices, a carriage, an electrically-actuated letter-spacing device for the carriage, and means incorporated in the totalizer-mechanism and effective under the joint control of said wheels and carriage to electrically determine the actuation of either the numeral-printing devices or the spacing device, to thereby print the accumulated total in proper denominational order in a computing zone.

30. In a combined typewriting and computing machine having a letter-feeding carriage-mechanism, a platen for carrying a work-sheet, and numeral-typing instrumentalities having keys which control said carriage-mechanism, the combination with a register having independently-accumulating members of different denominations selectable by said carriage-mechanism, and carry-over mechanism co-operative with said accumulating members, of means for accumulating in said register the amounts typed on the work-sheet, said accumulating means including a mechanically-operating digit-indexing mechanism controlled jointly by said keys and said carriage-mechanism, a total-key, and mechanism controlled by said total-key and co-operable with said accumulating members for automatically typing on the work-sheet the total accumulated by means of said accumulating members, said total-typing mechanism including a series of automatically-operating electromagnetic devices associated with the several numeral-typing instrumentalities, and selectively controlled by the accumulating members seriatim in co-ordination with the carriage-mechanism.

31. In a combined typewriting and computing mechanism, the combination with a series of digit-typing trains, a carriage controlled thereby, and an accumulating mechanism having denominational elements and controlled jointly by said trains and said carriage, of solenoids having means to drive said digit-typing trains, electrically-operating means for enabling said accumulating mechanism and said carriage jointly to select the solenoids and the denominations in which the digit-types are caused by the solenoids to print, said solenoids being controllable selectively by any element of the accumulating mechanism, and said carriage having means for selecting the denominations of said accumulating mechanism to be effective upon said typing trains, and a circuit-closing device brought into use automatically by the operation of the typing trains for rendering the solenoids ineffective.

32. In a combined typewriting and computing mechanism, the combination with a series of digit-typing trains, a carriage controlled thereby, and an accumulating mechanism having denominational elements and controlled jointly by said trains and said carriage, of solenoids having means to drive said digit-typing trains, electrically-operating means for enabling said accumulating mechanism and said carriage jointly to select the solenoids and the denominations in which the digit-types are caused by the solenoids to print, said solenoids being controllable selectively by any element of the accumulating mechanism, and said carriage having means for selecting the denominations of said accumulating mechanism to be effective upon said typing trains, and a circuit-closing device brought into use automatically by the operation of the typing trains for rendering the solenoids ineffective, and including universal means operable by any typing train for cutting out all of the solenoid circuits, thereby to release the operated typing train.

33. In a combined typewriting and computing mechanism, the combination with a series of digit-typing trains, a carriage controlled thereby, and an accumulating mechanism having denominational elements and controlled jointly by said trains and said carriage, of solenoids having means to drive said digit-typing trains, and electrically-operating means for enabling said accumulating mechanism and said carriage jointly to select the solenoids and the denominations in which the digit-types are caused by the solenoids to print, said solenoids being controllable selectively by any element of the accumulating mechanism, and said carriage having means for selecting the denominations of said accumulating mechanism to be effective upon said typing trains.

34. A combined typewriting and computing mechanism having, in combination, a carriage, electrically-actuated typing trains, an electrically-actuated spacing device for the carriage, a series of contact devices, means co-operating with said carriage to enable said contact devices to control the operation of the typing trains, said contact devices being divided into groups, and electrical means between said groups for operating said carriage-spacing device only.

35. In a combined typewriting and computing mechanism, numeral-printing devices, a set of wheels to accumulate the amounts printed, a carriage, a spacing device for said carriage, a total-key having means for releasing said carriage from the spacing device, means controlled by said total-key for arresting the carriage always at the highest denominational position in a total-printing zone, means responsive to actuation of the total-key and to those wheels which stand at zero ahead of the first significant figure for then causing said spacing device to step the carriage along, means called into action when the carriage arrives at the denomination corresponding to the first displaced accumulating wheel for taking the carriage-stepping means out of the control of the total-key and the aforesaid wheels which stand at zero, and electromagnetic circuits closed by the carriage for operating the printing devices and the carriage-spacing device under control of said wheels.

36. In a combined typewriting and computing mechanism, the combination of a carriage-mechanism, a series of numeral-types, keys therefor, a register including independently-accumulating members of successive denominations, means to enable said members to be moved to various extents, to accumulate the amounts which are typed a digit at a time by said keys, an electromagnetic device having means for operating each of said types independently of the others, a total-key, and means called into action by said total-key and controlled jointly by said accumulating members and said carriage-mechanism for automatically selecting and energizing an electromagnetic device in one denomination after another in correspondence with the computative positions to which the accumulating members of those denominations respectively have been set.

37. In a combined typewriting and computing mechanism, the combination of a totalizing mechanism, a carriage, a power-actuated space-bar for the carriage, power-actuated numeral-type bars operatively connected with the totalizing mechanism to thereby control the printing of the numeral representing the total, and means controlled by the carriage for calling into action either the type-bars as controlled by said totalizing mechanism or the space-bar, to thereby print the numeral entered in the totalizing mechanism and to provide a space at decimal-point position.

38. In a combined typewriting and computing mechanism, the combination of a series of totalizing mechanisms, type-bars representing numerals from "0" to "9", a carriage, a spacing device for the carriage, said spacing device being effective to space the carriage at decimal-point position, and a selecting device under control of the carriage and said totalizing mechanisms to select the type-bar in accordance with the figures of a number entered in any one of the totalizing mechanisms and to actuate the spacing device at decimal-point position.

39. In a combined typewriting and computing mechanism, the combination of a totalizing mechanism, including a total-key, for accumulating a total, electrically-actuated numeral-typing members, an electrically-actuated letter-spacing member, a carriage, means whereby operation of the total-key positions the carriage in a computing zone for the printing of a total, and means under the joint control of the totalizing mechanism and carriage to letter-space the carriage to a denominational position in the zone, and then electrically select for operation the numeral-typing members representing the total.

40. In a combined typewriting and computing mechanism, the combination of a totalizing mechanism settable to be actuated for either addition or subtraction, typewriting devices including a carriage, tabulating devices for the carriage, and a total-key operable to simultaneously set the totalizer to be actuated subtractively and to actuate the tabulating devices.

41. In a combined typewriting and computing mechanism, the combination of a totalizing mechanism settable to be actuated for either addition or subtraction, typewriting devices including a carriage and electromagnetically operable printing devices, tabulating devices for the carriage, and a total-key operable to simultaneously set the totalizing mechanism to a subtractive state, and to actuate the tabulating devices and to connect the printing devices to function under joint control of the totalizing mechanism and carriage to print a total.

42. In a combined typewriting and computing mechanism, the combination of a totalizing mechanism, devices for printing a total, a controlling device for the printing devices cooperating with the totalizing mechanism, a carriage, a tabulating key for the carriage, said tabulating key being effective to position the carriage for the number of highest decimal order, a total-key for placing the carriage and totalizing mechanism in control of the printing devices, and means under control of the total-key to actuate the tabulating key.

43. In a combined typewriting and computing mechanism, the combination of a carriage, key-controlled numeral-type bars including a zero-type bar, a totalizer, mechanism for computing in said totalizer amounts printed by the numeral-type bars, and means, including a total-key and a tabulating mechanism controlled thereby, for automatically positioning the typewriter-carriage and for successively typing one by one upon a work-sheet the digits forming the amount computed in the totalizer, said means including electromagnetically-operated means for driving said type-bars under the joint control of the totalizer and carriage.

44. In a combined typewriting and computing mechanism, the combination of a carriage having a letter-space feed, numeral-type bars including a zero-type bar, mechanism for accumulating in a totalizer amounts set by the numeral-type bars, a total-key, and means for automatically tabulating the carriage to a computing zone and then successively typing upon a work-sheet the amount accumulated in the totalizer upon depression of the total-key, said means including devices for effecting automatic letter-spacing of the carriage from the tabulated position to the position of the first significant digit of the number to be typed.

45. In a combined typewriting and computing mechanism, the combination of numeral-type bars, a platen, a carriage therefor, a letter-spacing mechanism for said carriage, electromagnetic devices for operating the type-bars, an electromagnetic device for operating the letter-spacing mechanism, a register for accumulating the amounts typed by said type-bars, and means, including a total-key, for automatically typing and letter-spacing the numerals accumulated in said register, said means including also a block of insulating material having a series of digit-value bars and a series of denominational bars normally disconnected from the digit-bars but each being connectible with any one of the digit-value bars by means associated with the register, said block being normally out of effective position, and means controlled by the total-key for moving the contact block to its effective position.

46. In a combined, typewriting and computing mechanism, the combination of a carriage, numeral-type bars, electrical circuits having electromagnetic devices for operating said type-bars, means for accumulating the amounts typed by said type-bars, including a series of denominational wheels, and also including a series of indexing pin-bars, contact devices carried by said wheels, means co-operating with said contact devices for closing the electrical circuits for such of the type-bar-operating devices as correspond to the various numerals of the amount accumulated in the denominational wheels, and a series of switches associated with said pin-bars, said switches being effective to close in succession and to operate the type-bars in proper denominational positions of the carriage.

47. In a combined typewriting and computing mechanism having numeral-type bars, a register for computing the amounts typed by said type-bars, a carriage, having a letter-spacing mechanism including a space-bar for controlling the denominational position of the numerals typed; a tabulating mechanism for the carriage, electromagnetic means for operating the type-bars and the space-bar, and means, including a total-key, for automatically operating said tabulating mechanism for jumping the carriage to its highest denominational position in a computing zone; said electromagnetic means including a device for automatically letter-spacing the carriage up to the first significant figure of the amount to be typed.

48. In combination, a set of types, a carriage connected with said types for letter-feeding, a set of accumulator-members of successive denominations, a set of normally-open solenoid circuits, one for each type to operate the same, said solenoid circuits being selectively co-operable with one after another of said accumulator-members, a total-key, means to enable said total-key to bring all said solenoid circuits simultaneously into position effective for selective partial closure of said circuits by said accumulator-members, so that each of the latter depending on its computative position may select the circuit for the type of corresponding value, said circuits including denominational openings closable seriatim by means of the carriage to energize the solenoid circuit selected by each accumulator-member, and cause the selected solenoid to print the corresponding digit-type in the proper denominational position, means for automatically disabling the solenoids and permitting the active type to return, and to enable the carriage to feed, and means rendered effective at the return of the type and feeding of the carriage, for restoring the solenoid circuits to effective condition, and also causing, by means of one of said closable denominational openings, the autmatic closing of the solenoid circuit that is selected by the accumulator-member of the next denomination.

49. The combination of a set of computation devices indexable denominationally, one by one, for setting up an amount, a carriage co-operating to so index said devices, a series of numeral-type bars, solenoid circuits having means for operating said type-bars, and circuit-selecting devices controlled jointly by said computation devices and said carriage.

50. The combination of a set of independent accumulating members, a series of numeral-keys, means, including a carriage, associated with said keys for setting up an amount digit by digit for subsequent accumulation of said amount in said accumulating members, a series of numeral-types mounted to print at a common printing point, solenoid circuits independent of direct control by said keys, and means controlled jointly by said accumulating members and said carriage, for selecting and closing the solenoid circuits, to cause said types to print digit by digit the amount that is set up on said accumulating members.

51. The combination of a letter-feeding carriage, a set of numeral-types, a register having accumulators, a set of solenoids, one for driving each type, each of said solenoids being co-operable with with each of said accumulators, a total-key, and means under the control of the total-key to enable said carriage to place said accumulators seratim in selective control of all said solenoids, to make a selection according to the computative position of the accumulator, to cause the printing of the corresponding digit.

52. In combination, numeral-types, a letter-feeding carriage, a register having a set of accumulators, a set of solenoids and circuits, for each type, all said solenoids being co-operable with each of said accumulators, said circuits being selectively closable by each accumulator, said accumulators and said circuits being normally separated, a total-key, means to enable said total-key to establish co-operation between the accumulators and circuits, all said solenoid circuits being selectively brought into effective co-operation with each of said accumulators, while the solenoid circuits still remain open, and means to enable said carriage to bring said accumulators seratim into service by closing the appropriate solenoid circuit, dependent upon the computative position of the accumulator, to cause the selected solenoid to print its digit-type.

53. In a combined typewriting and computing mechanism, the combination of a carriage, a series of typing members actuable one by one to print numerals, a carriage-feeding device, a total register, electric circuits controllable by the register and having actuating devices for the typing members, a carriage-controlled closer for said circuits, and means under control of each of the typing members and operative to shunt the circuit-closer and related electric circuit to short-circuit same, and also to actuate the carriage-feeding device when the typing member is moved to printing position, and also to restore the shunted circuit-closer and related electric circuit to potential efficiency when the typing member is returned to normal position.

54. In a combined typewriting and computing mechanism, the combination with a series of total-wheels, of a set of electrically-operated typing members electrically selectable by the total-wheels preparatory to printing totals, a carriage, an electrically-operated spacing device for the carriage electrically selectable by means of the total-wheels, a series of contacts, representing the denominational orders, for closing the circuits to thereby actuate the typing members and the spacing device, pin-bars, and means co-operating with the pin-bars and the carriage to close the contacts in succession from highest to lowest denominational order.

55. Means for controlling electromagnetically-operated type-bars, including a register having a series of denominational wheels, each wheel having a number of teeth equal to a multiple of ten, every tenth tooth being longer than the other teeth, and a contact block of insulating material, said block having a series of denominational bars and digit bars, said bars being arranged to be bridged by said longer teeth, said contact block being normally ineffective for co-operation with the contact teeth of the total-wheels, and means controlled by a total-key for moving the contact block as a unit to its effective position.

56. In a combined typewriting and computing mechanism, the combination of a carriage, numeral-type bars including a zero-type bar, a totalizer, a total-key, mechanism for running into said totalizer amounts set by the numeral-type bars, and means, including a tabulating mechanism, for automatically positioning the typewriter-carriage and for successively typing upon a work-sheet the amount computed in the totalizer, upon depression of the total-key.

57. In a combined typewriting and computing mechanism, the combination of a carriage having a letter-space feed, key-operable numeral-type bars including a zero-type bar, electromagnetic means for operating the type-bars, mechanism for accumulating in a totalizer amounts set by the numeral-type bars, a total-key, and means controlled by the total-key for automatically tabulating the carriage to a computing zone and then successively typing upon a work-sheet by means of said electromagnetic means the amount accumulated in the totalizer upon depression of the total-key, said total-key controlled means including means for automatically letter-spacing the carriage from the column-set position to the position of a significant digit of highest denominational order of the numeral to be typed.

58. In a combined typewriting and computing machine provided with a letter-feeding carriage, a register having accumulators, digit-keys, and mechanism controlled by said keys for operating said register, mechanism having digit-types operable by said keys, a total-typing mechanism including solenoids, the digit-types being operable by either the keys or the solenoids, solenoid-circuits, each closable at two points to energize its solenoid, means to enable each accumulator to select a solenoid-circuit and close the same at one point according to the computative position of the accumulator, and means to enable said carriage to close each selected circuit at the other point, to cause a type to be operated by the solenoid in correspondence with the position of the accumulator, and means dependent upon the approach of the type to the platen for cutting out the active solenoid.

59. In a combined typewriting and computing mechanism, having, in combination, a carriage, power-actuated type-members, a solenoid for each type-member, totalizing mechanism including a series of denominational and digital contact devices closable by said totalizing mechanism to select a certain solenoid for each denomination for the operation of the type-members, and means under control of the carriage for operatively connecting the selected solenoids via the closed contact devices in denominational succession to a solenoid operating circuit.

60. In a combined typewriting and computing mechanism, the combination of a register and register-driving mechanism including pin-bars, a platen having a letter-feeding mechanism, a series of numeral-type bars, a series of electromagnetic coils selectable by said register preparatory to operating said type-bars, means released by the register-pin-bars for energizing the selected coils to operate the type-bars to type, and means for automatically de-energizing said coils when the type-bars strike the platen, to thereby permit the return movement of the type-bars, said last-mentioned means including a switch in the circuit of the electromagnetic coils that is closed during the typing movement of the type-bars, and opened concomitantly with the initial letter-spacing movement of the platen.

61. In a combined typewriting and computing mechanism, the combination of a series of total-wheels for accumulating numeral values, electrically-actuated numeral-printing devices, a carriage, an electrically-actuated letter-spacing device for the carriage, a circuit-distributing block, associated with said total-wheels containing contact members individual to each wheel, each numeral value and to the letter-spacing device, and circuit-closing means complementary to said distributing block and operable at different positions of the carriage to selectively letter-space the carriage or letter-space and type a numeral.

62. In a combined typewriting and computing mechanism, the combination of a series of total-wheels, a letter-feeding carriage, numeral-printing keys electrically operable to print, a tabulator-key operable to tabulate the carriage to the highest denominational position in a computing zone, and circuit-controlling means including numeral-key-selecting contacts selectively closed by said wheels preparatory to typing and also including a series of denominational contacts automatically operable seriatim upon the release of the tabulated carriage from the tabulator-key, said circuit-controlling means effective to selectively operate the numeral-keys to print.

RICHARD von REPPERT.